(12) United States Patent
Aube et al.

(10) Patent No.: US 9,580,536 B2
(45) Date of Patent: Feb. 28, 2017

(54) PROCESS FOR STABILIZING PHENOLIC RESINS CONTAINING CALIXARENES

(71) Applicant: SI GROUP, INC., Schenectady, NY (US)

(72) Inventors: Todd Aube, Schenectady, NY (US); Gennaro Barbiero, Niskayuna, NY (US); Ricky Biittig, Middle Grove, NY (US); James M. Baxter, Jr., Johnstown, NY (US)

(73) Assignee: SI GROUP, INC., Schenectady, NY (US)

(*) Notice: Subject to any disclaimer, the term of this patent is extended or adjusted under 35 U.S.C. 154(b) by 0 days.

(21) Appl. No.: 14/919,509

(22) Filed: Oct. 21, 2015

(65) Prior Publication Data
US 2016/0108231 A1 Apr. 21, 2016

Related U.S. Application Data

(60) Provisional application No. 62/066,471, filed on Oct. 21, 2014.

(51) Int. Cl.
C08G 8/36 (2006.01)
C08L 61/14 (2006.01)
C08G 8/12 (2006.01)
C08G 8/28 (2006.01)

(52) U.S. Cl.
CPC ............... C08G 8/36 (2013.01); C08G 8/12 (2013.01); C08G 8/28 (2013.01); C08L 61/14 (2013.01); C08L 2205/025 (2013.01)

(58) Field of Classification Search
CPC ...... C08G 8/36; C08L 61/14; C08L 2205/025
USPC ........................................................ 525/534
See application file for complete search history.

(56) References Cited

U.S. PATENT DOCUMENTS

| 3,873,490 | A | * | 3/1975 | Grazen | C08G 8/08 523/157 |
|---|---|---|---|---|---|
| 4,032,514 | A | | 6/1977 | Buriks et al. | |
| 4,046,521 | A | * | 9/1977 | Bessler | C10L 1/1817 44/332 |
| 4,054,554 | A | * | 10/1977 | Buriks | C10L 1/1817 525/507 |
| 4,259,464 | A | | 3/1981 | Buriks et al. | |
| 4,699,966 | A | | 10/1987 | Harris et al. | |
| 5,205,964 | A | | 4/1993 | Stephenson et al. | |
| 5,272,226 | A | | 12/1993 | Lancaster et al. | |
| 5,663,246 | A | * | 9/1997 | Spaltenstein | C08G 8/36 525/398 |
| 6,271,337 | B1 | | 8/2001 | Lamartine et al. | |
| 7,977,284 | B2 | | 7/2011 | Berger et al. | |
| 2011/0239978 | A1 | * | 10/2011 | Dambacher | C10M 145/20 123/196 R |
| 2012/0061128 | A1 | * | 3/2012 | Ito | C08G 8/30 174/255 |

FOREIGN PATENT DOCUMENTS

| EP | 0480687 A2 | 4/1992 |
| EP | 0480658 B1 | 2/1996 |
| EP | 2374866 B1 | 9/2012 |

* cited by examiner

Primary Examiner — Mike M Dollinger
(74) Attorney, Agent, or Firm — Jeffrey N. Townes; LeClairRyan

(57) ABSTRACT

This invention relates to a process for stabilizing a phenolic resin containing a mixture of linear phenolic resins and calixarenes and a demulsifier composition comprising the stabilized phenolic resins prepared from the process. The process comprises contacting the phenolic resin with an alkylene carbonate, in the presence of a base catalyst, to at least partially alkoxylate the phenolic hydroxyl groups of the calixarenes. This process forms a stabilized phenolic resin with an increased solubility in a hydrocarbon solvent.

20 Claims, No Drawings

PROCESS FOR STABILIZING PHENOLIC RESINS CONTAINING CALIXARENES

This application claims the benefit of priority of U.S. Provisional Patent Application Ser. No. 62/066,471, filed Oct. 21, 2014, which is hereby incorporated by reference in its entirety.

FIELD OF THE INVENTION

This invention generally relates to a process for stabilizing a phenolic resin containing a mixture of a linear phenolic resin and a cyclic phenolic resin (e.g., calixarene) to improve the solubility of the phenolic resin in a hydrocarbon solvent. The invention also relates to a demulsifier composition comprising the stabilized phenolic resins prepared from the process.

BACKGROUND

Phenolic resins have been used as components of demulsifier and dehazer formulations, e.g., in oilfield, refining, and fuel applications. These resins are useful for the efficient separation of emulsions, e.g., separating oil from water. Depending how the phenolic resins are prepared, the phenolic resin may contain mainly linear phenolic resins or a mixture of linear phenolic resins and cyclic phenolic resins (e.g., calixarenes). For instance, certain oil field resins can contain 20% or more calixarenes.

It is advantageous to use phenolic resins containing a mixture of linear phenolic resins and cyclic phenolic resins because the linear/cyclic phenolic resin mixture is a more efficient demulsifier in certain oil emulsions compared to the phenolic resin containing mainly linear phenolic resins.

However, the main problem of using the phenolic resins containing the linear/cyclic phenolic resin mixture is the instability of the product. When the phenolic resin containing such a mixture is prepared, significant amounts of insolubles will typically precipitate out of the resin solution. Thus, the final product typically settles and forms a cake at the bottom of the container when stored for a short period of time, making it difficult to be processed further. To obviate this problem, the resin material can be made and shipped hot and within a short distance. However, this solution can significantly limit the utilization of the phenolic resin product.

Therefore, there is a need in the art to develop a process to stabilize phenolic resins containing a mixture of linear and cyclic phenolic resin to improve the solubility and stability of the phenolic resins in a hydrocarbon solvent. This invention answers this need.

SUMMARY OF THE INVENTION

One aspect of the invention relates to a process for stabilizing a phenolic resin containing a mixture of linear phenolic resins and calixarenes. The process comprises contacting the phenolic resin with an alkylene carbonate, in the presence of a base catalyst, to at least partially alkoxylate the phenolic hydroxyl groups of the calixarenes. This process forms a stabilized phenolic resin mixture. About 0.2 to 1 mole of alkylene carbonate reacts with the phenolic hydroxyl groups for each mole of the phenolic resin.

Another aspect of the invention relates to a process for stabilizing a phenolic resin containing a mixture of linear phenolic resins and calixarenes. The process comprises contacting the phenolic resin with an alkylene carbonate, in the presence of a base catalyst and a hydrocarbon solvent, to at least partially alkoxylate the phenolic hydroxyl groups of the calixarenes. This process forms a stabilized phenolic resin mixture, wherein less than 10% of the calixarenes precipitate out of the solvent after 24 hours.

Another aspect of the invention relates to a process for increasing the solubility of a linear phenolic resin/calixarene mixture. The process comprises contacting a phenolic resin containing a mixture of linear phenolic resins and calixarenes with an alkylene carbonate, in the presence of a base catalyst, to at least partially alkoxylate the phenolic hydroxyl groups of the calixarenes. This process increases the solubility of the linear phenolic resin/calixarene mixture in a hydrocarbon solvent by at least 50%.

Another aspect of the invention relates to a demulsifier composition comprising the stabilized phenolic resin mixture prepared by the process discussed above.

DETAILED DESCRIPTION OF THE INVENTION

This invention relates to a process for stabilizing a phenolic resin containing a mixture of linear phenolic resins and cyclic phenolic resins (e.g., calixarene) to improve the solubility of the phenolic resin in a hydrocarbon solvent. The phenolic resin containing calixarenes is modified with an alkylene carbonate, generating a partially alkoxylated derivative that is soluble in a hydrocarbon solvent at room temperature or cold temperature, e.g., at −25° C. Accordingly, the solubility of the resulting phenolic resin is dramatically improved, resulting a stable, easy to handle calixarene/linear phenolic resin mixture intermediate for utilization as a demulsifier to separate oil and water emulsion in applications such as oilfield, petroleum, and fuel applications.

One aspect of the invention relates to a process for stabilizing a phenolic resin containing a mixture of linear phenolic resins and calixarenes. The process comprises contacting the phenolic resin with an alkylene carbonate, in the presence of a base catalyst, to at least partially alkoxylate the phenolic hydroxyl groups of the calixarenes. About 0.2 to 1 mole of alkylene carbonate reacts with the phenolic hydroxyl groups for each mole of the phenolic resin.

This process forms a stabilized phenolic resin with an increased solubility in a hydrocarbon solvent compared to the phenolic resin without being subjected to such process.

Accordingly, one aspect of the invention relates to a process for stabilizing a phenolic resin containing a mixture of linear phenolic resins and calixarenes. The process comprises contacting the phenolic resin with an alkylene carbonate, in the presence of a base catalyst and a hydrocarbon solvent, to at least partially alkoxylate the phenolic hydroxyl groups of the calixarenes. The process forms a stabilized phenolic resin mixture, wherein less than 10% of the calixarenes precipitate out of the solvent after 24 hours.

Yet another aspect of the invention relates to a process for increasing the solubility of a linear phenolic resin/calixarene mixture. The process comprises contacting a phenolic resin containing a mixture of linear phenolic resins and calixarenes with an alkylene carbonate, in the presence of a base catalyst, to at least partially alkoxylate the phenolic hydroxyl groups of the calixarenes. The process increases the solubility of the linear phenolic resin/calixarene mixture in a hydrocarbon solvent by at least 50%.

The phenolic resins include a mixture of linear phenolic resins and cyclic phenolic resins, such as calixarenes.

The linear phenolic resins may contain a substituent on the benzene ring, at either the ortho or para position to the hydroxyl of linear phenolic resins. Typically, the linear phenolic resin has a structure of Formula (I):

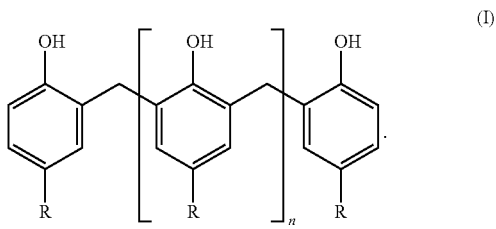

(I)

The substituent group on the benzene ring of the linear phenolic resin (or R in Formula (I)) may be H, $C_1$ to $C_{30}$ alkyl, phenyl, or arylalkyl. For instance, the substituent group (or R in Formula (I)) may be $C_4$ to $C_{18}$ alkyl, $C_4$ to $C_{12}$ alkyl, or $C_1$ to $C_7$ alkyl. The number of repeating units of the linear phenolic resin (or n in Formula (I)) may be 2 to 20, for instance, 2 to 10, 2 to 8, 2 to 6, or 2 to 4, resulting a molecular weight ranging from about 500 to about 3,000 Daltons.

The phenolic resins contain calixarenes ranging from about 5% to about 99%, for instance, from about 5% to about 75%, or from about 20% to about 75%, typically from about 20% to about 50%.

The term "calixarene" generally refers to a variety of derivatives that may have one or more substituent groups on the hydrocarbons of cyclo{oligo[(1,3-phenylene)methylene]}. The calixarenes may contain a substituent on the benzene ring of calixarenes. Typically, the calixarene has a structure of Formula (II):

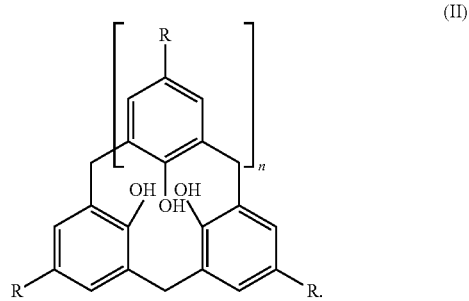

(II)

The substituent group on the benzene ring, of the calixarene (or R in Formula (II)) may be H, $C_1$ to $C_{30}$ alkyl, phenyl, or arylalkyl. For instance, the substituent group (or R in Formula (II)) may be $C_4$ to $C_{18}$ alkyl, $C_4$ to $C_{12}$ alkyl, or $C_1$ to $C_7$ alkyl. The number of repeating units of the calixarene (or n in Formula (II)) may be 2 to 20, for instance, 2 to 10, 2 to 8, 2 to 6, or 2 to 4, resulting a molecular weight ranging from about 500 to about 3,000 Daltons. An exemplary calixarene structure is shown as below, wherein n is 4.

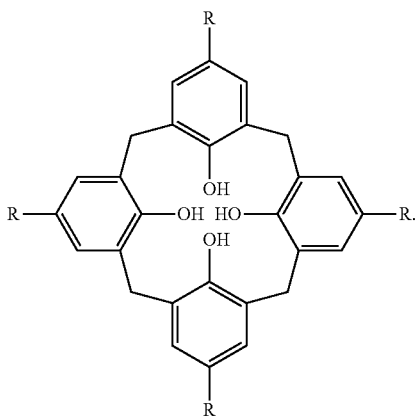

The phenolic resins, e.g., phenolic novolac resins, can be prepared in any suitable manner known in the art for preparation of phenolic resins. Typically, one or more phenolic compounds are reacted with an aldehyde to form a phenolic resin. An additional aldehyde may be added later to adjust the desirable melt point of the phenolic resin.

The reaction of the phenolic compound and the aldehyde is conducted in the presence of a base catalyst. Such base-catalyzed reaction results in phenolic resins containing a mixture of linear phenolic resins and calixarenes.

Suitable base catalysts for the reaction of the phenolic compounds and the aldehyde include ammonium hydroxide; tertiary amines such as triethylamine, triethanolamine, diethyl cyclohexyl amine, and triisobutyl amine; and alkali and alkaline earth metal oxides and hydroxides. The amount of the catalyst may range from about 0.1 wt % to about 20 wt %, for instance, from about 0.1 wt % to about 10 wt %, from about 0.1 wt % to about 2 wt %, Alternatively, the reaction of the phenolic compound and the aldehyde can also be carried out under high-dilution conditions. For instance, the reaction of the phenolic compound and the aldehyde may be conducted in the presence of a large amount of a solvent, e.g., with the solvent concentration of about 80 wt %.

Suitable phenolic compounds for preparing the phenolic resins include phenol and its derivatives, which may contain one or more substituents on the benzene ring of the phenolic compound, at either the ortho or para position to the hydroxyl of the phenolic compound. If the substituent group is at the para position to the hydroxyl group of the phenolic compound, the resulting alkylene bridge (e.g., methylene bridge if formaldehyde is used) extends in the para positions to the hydroxyl group of the phenolic compound. If the substituent group is at the ortho position to the hydroxyl group of the phenolic compound, the resulting alkylene bridge can extend in the para position to the hydroxyl group of the phenolic compound and the other substituted ortho position to the hydroxyl group of the phenolic compound.

The substituent on the benzene ring of the phenolic compound may be $C_1$-$C_{30}$ alkyl, phenyl, or arylalkyl. Typically, the phenolic compound contains one $C_1$ to $C_7$ alkyl substituent at the para position. Exemplary phenolic compounds are phenol and alkylphenols including para-methylphenol, para-tert-butylphenol (PTBP), para-sec-butylphenol, para-tert-hexylphenol, para-cyclohexylphenol, para-tert-octylphenol (PTOP), para-isooctylphenol, para-decylphenol, para-dodecylphenol, para-tetradecyl phenol, para-octadecylphenol, para-nonylphenol, para-pentadecylphenol, and para-cetylphenol.

The phenolic resins may be prepared from one or more phenolic compounds reacting with an aldehyde forming an oligomer of repeating units of phenolic monomers. The resulting linear phenolic resin may be a homopolymer of phenolic monomer, or a copolymer containing different units of phenolic monomers, e.g., when two or more different phenolic compounds were reacted with an aldehyde. Similarly, the resulting calixarenes may be a homopolymer of phenolic monomer or a copolymer containing different units of phenolic monomers.

Any aldehyde known in the art for preparing a phenolic resin is suitable in this process. Exemplary aldehydes include formaldehyde, methylformcel, butylformcel, acetaldehyde, propionaldehde, butyraldehyde, crotonaldehyde, valeraldehyde, caproaldehyde, heptaldehyde, benzaldehyde, as well as compounds that decompose to aldehyde such as paraformaldehyde, trioxane, furfural, hexamethylenetriamine, aldol, β-hydroxybutyraldelhyde, and acetals, and mixtures thereof. A typical aldehyde used is formaldehyde.

To prepare a phenolic resin, the molar ratio of the total amount of an aldehyde to phenolic compounds is in the range from 0.5:1 to 1:1, for instance, from 0.8:1 to 1:1, or from 0.9:1 to 1:1.

The reaction of the phenolic compounds and the aldehyde is typically carried out in a hydrocarbon solvent, such as an aromatic hydrocarbon solvent. For example, the solvent can be an alkylbenzene such as toluene, xylenes, or tetralin, or other aromatic hydrocarbon solvents such as SOLVESSO™.

The phenolic resins prepared from the above process contain a mixture of linear phenolic resins and cyclic phenolic resins, such as calixarenes. The solubility of calixarenes in these resins is poor and, thus, undissolved solids would precipitate out of the resin solution once the phenolic resins are prepared. Typically, about 20 wt % to 40 wt % of the phenolic resins precipitate out of the resin solution almost immediately after the resins are produced, causing the instability of the resins for subsequent utilization. Once these insolubles precipitate out, it is difficult to dissolve the solids in the resin solution, thus reducing the amount of active ingredients (i.e., linear phenolic resins and cyclic phenolic resins) in the resin solution for further utilization and making the handling and transportation of the resin product difficult.

In this invention, the phenolic resins are contacted with an alkylene carbonate, in the presence of a base catalyst, to at least partially alkoxylate the phenolic hydroxyl groups of the calixarenes. The phenolic hydroxyl groups of the linear phenolic resins can also be at least partially alkoxylated. By this process, a stabilized phenolic resin is formed with an increased solubility and reduced Tg (glass transition temperature) of the resins.

The alkoxylation (or etherification) of the phenolic hydroxyl groups of the linear phenolic resin by an alkylene carbonate (e.g., propylene carbonate) is illustrated in the following exemplary scheme, Scheme 1. The alkoxylation (or etherification) of the phenolic hydroxyl groups of the calixarene phenolic resin by an alkylene carbonate (e.g., propylene carbonate) is illustrated in the following exemplary scheme, Scheme 2.

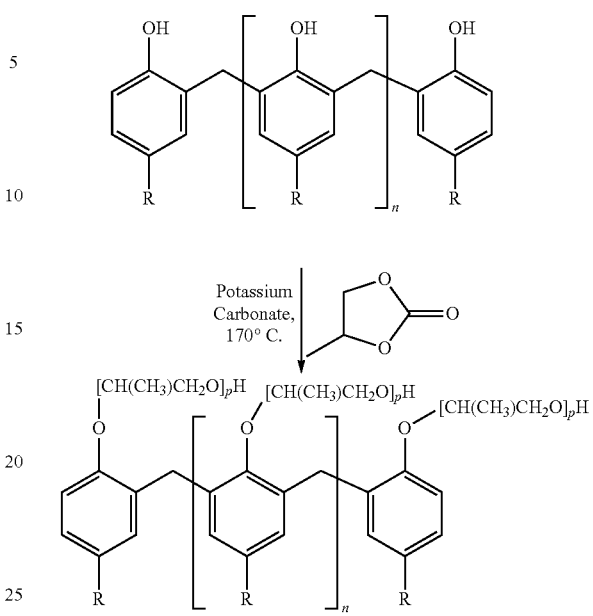

Scheme 1

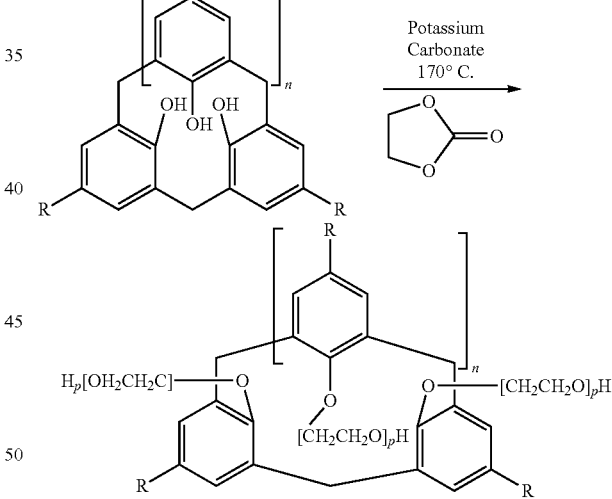

Scheme 2

In the above schemes, R may be H, $C_1$ to $C_{30}$ alkyl, phenyl, or arylalkyl. Each n is independently 2 to 20. Each p is independently 0 to 8. Depending on the amount of the alkylene carbonate used, each p may be independently 0 to 6, 0 to 5, 0 to 4, 0 to 3, 0 to 2, or 0 to 1. Typically, when the molar ratio of alkylene carbonate to phenolic resins is 1:1 or less, p is either 0 or 1.

Suitable alkylene carbonates have 2-4 carbon atoms, although other alkylene carbonates known to one of skill in the art may also be used. The phenolic resins may be modified by one or more alkylene carbonates. Exemplary alkylene carbonates include ethylene carbonate, propylene carbonate, and butylene carbonate. Typically, propylene carbonate is used.

Suitable base catalysts for the reaction of the phenolic resins and an alkylene carbonate include, but are not limited to, potassium hydroxide, potassium carbonate, and imidazole. A typical base catalyst is potassium carbonate. The amount of the catalyst may range from about 1 wt % to 5 wt %, for instance, from about 1 wt % to 2 wt %.

The reaction of phenolic resins and an alkylene carbonate may be carried out at any suitable temperature from about 130° C. to about 200° C. Typically, the reaction temperature ranges from 160° C. to 180° C.

The amount of alkylene carbonate added to react with the phenolic resins is in a molar ratio of alkylene carbonate to phenolic resins ranging from 0.2:1 to 1:1. For example, the molar ratio of alkylene carbonate to phenolic resins can be greater than 0.2:1, for instance, from 0.25:1 to 1:1, but not more than 1:1. In an exemplary embodiment, in which greater than 0.25 moles of an alkylene carbonate is added to 1 mole of the phenolic resins mixture, a complete dissolution of the calixarenes is achieved, resulting in a clear resin solution containing 40-60% resins be weight in an aromatic solvent.

Modifying the phenolic resins by reacting with an alkylene carbonate not only improves the solubility of the resins, but also reduces the Tg (glass transition temperature) of the resins, which can provide various benefits. For example, when the molecular weight of the phenolic resin is increased, e.g., to the range of 6000 to 10000 Dalton, the molten viscosity of the resin is high and the resin can become difficult to process. More solvent can be added to reduce the viscosity of the resin, as has been done in conventional processes, but this creates other issues.

Advantageously, the process of the invention reduces the molten viscosity of the resin without adding additional solvent. The resulting products thus contain a higher percentage of active materials (i.e., linear phenolic resins and cyclic phenolic resins) in the resin solution and a lower percentage of solvent in the resin solution. Accordingly, the process can reduce cost (including the cost in production and in transportation logistics), and improve processing (less solvent is used, yet with improved solubility and molten viscosity).

The process is also more environment friendly than the conventional preparation of phenolic resins without undergoing such a reaction. The process minimizes the formation of certain alkylphenol monomer that may be contained in the phenolic resins as residual compounds, such as para-nonylphenol, which can be an environmental concern. However, when para-nonylphenol is modified with an alkylene carbonate, it becomes non-estrogenic.

After the reaction of the phenolic resins with an alkylene carbonate, the solubility of the linear phenolic resin/calixarene in a hydrocarbon solvent can be significantly increased, compared to the solubility of the linear phenolic resin/calixarene in the hydrocarbon solvent without subjecting the resin mixture to such process, for instance, by at least 20%, at least 40%, at least 50%, at least 60%, at least 80%, at least 100%, or at least 1.2 fold. The hydrocarbon solvent is typically contained in the resulting stabilized phenolic resin because the phenolic resin is typically prepared in the presence of a hydrocarbon solvent, as discussed in the embodiments above.

Accordingly, the reaction of the phenolic resins with an alkylene carbonate, less than 30% of the calixarenes precipitate out of the solvent after the storage of 24 hours or longer. For instance, less than 20%, less than 10%, or less than 5% of the calixarenes precipitate out of the solvent after the storage of 24 hours or longer. When an appropriate amount of alkylene carbonate is reacted with the phenolic resin, the resulting stabilized phenolic resin can be a resin solution substantially free of undissolved solid components, without adding additional solvents to the reaction system, at a temperature of −25° C. or above.

An exemplary embodiment is provided in Examples 1 and 3. In Example 1, a mixture of para-butylphenol and para-nonylphenol was reacted with formalin in an aromatic solvent in the presence of a base catalyst when heated to reflux. After the reaction was complete, the percentage of the resulting resins was adjusted to 53-55 wt % by adding an aromatic solvent. During the reaction, the product started to precipitate out of the resin solution, and the appearance of the final product was a suspension of partially insoluble material. In Example 3, the resin produced in Example 1 was reacted with propylene carbonate in the presence of potassium carbonate at a temperature of 170-180° C. The samples of the final resin product from the reactions in Example 1 and 3 were left under room temperature and then placed in the freezer at −25° C. for 24 hours. The appearance and amount of undissolved solids from the samples from Example 1 and 3, with varying the amounts of reactants, were then compared. When the resin was not reacted with alkylene carbonate (Example 1), the appearance of the final resin was a cloudy suspension with precipitates, and the percentage of the insoluble precipitate was more than 20 wt %. On the other hand, after the resin from Example 1 was reacted with alkylene carbonate (Example 3), the resin became completely clear solution and remained completely soluble even when subjected to −25° C. temperature for 24 hours. Thus, the solubility of the alkoxylated (or etherified) calixarenes in the resulting resin (Example 3) was increased at least by 60%, compared to the phenolic resin without being subjected to the reaction in Example 1.

A similar exemplary embodiment is provided in Examples 2 and 4. The reaction procedures of Examples 2 and 4 are similar to the reaction procedures of Examples 1 and 3, respectively, except that the calixarene/linear alkylphenolic resin is prepared by para-tert-butylphenol, instead of a mixture of para-butylphenol and para-nonylphenol. In Example 2, when the resin was not reacted with alkylene carbonate, the appearance of the final resin was a cloudy suspension with precipitates, and the percentage of the insoluble precipitate was almost 30 wt %. On the other hand, after the resin from Example 2 was reacted with alkylene carbonate (Example 4), the resin became completely clear solution and remained completely soluble even when subjected to −25° C. temperature for 24 hours. Thus, the solubility of the alkoxylated (or etherified) calixarenes in the resulting resin (Example 4) was increased at least by 1.2 fold, compared to the phenolic resin without being subjected to the reaction in Example 2.

Another aspect of the invention relates to a demulsifier composition comprising the stabilized phenolic resin mixture prepared by the process discussed above. The resulting stabilized phenolic resin mixture can be used as a demulsifier or an intermediate for further preparation of a demulsifer comprising one or more other components commonly used in a demulsifier composition.

As discussed above, modifying the phenolic resins by reacting with an alkylene carbonate converts the phenolic hydroxyl groups of the phenolic resin to alkoxy groups (or ether groups), resulting in at least partially alkoxylated phenolic resins. These alkoxylated phenolic resins can be used for a wide variety of applications for oil and water separation, such as refinery and fuel dehazing.

As known by one skilled in the art, surfactants, demulsifiers, or dehazers are typically amphiphilic compounds that contain both a hydrophobic portion that is water insoluble (oil-soluble) and a hydrophilic portion that is water-soluble. Here, for the alkoxylated phenolic resins, the benzene ring or alkyl/aryl substituted benzene ring portion of the alkoxylated phenolic resins serves as the hydrophobic portion and the ether or ether oligomer portion of the alkoxylated phenolic resins serves as the hydrophilic portion. Thus, both the linear alkoxylated phenolic resin and calixarene alkoxylated phenolic resins in the resulting alkoxylated phenolic resins can be used as components serving demulsifying and dehazing functions.

These alkoxylated phenolic resins are stable and soluble in aromatic solvents. The resin solution of the alkoxylated phenolic resin can reach a concentration of 50% to 75% by weight.

Also, the alkoxylated phenolic resins can be further reacted with an alkylene carbonate or an alkylene oxide to form a longer chain oligomer of ether (e.g., adding additional unit of ether groups by further reacting the ether group of the alkoxylated phenolic resins with the alkylene carbonate or alkylene oxide). The resulting product with a longer chain oligomer of ether is known in the art to be an effective demulsifier. Thus, the reaction used in the process for preparing the stabilized phenolic resins will not affect the surfactant properties of the desired demulsifier.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are given as particular embodiments of the invention and to demonstrate the practice and advantages thereof. It is to be understood that the examples are given by way of illustration and are not intended to limit the specification or the claims that follow in any manner.

Example 1

Synthesis of a Mixture of Calixarene/Linear Alkylphenolic Resins (Resin A)

A reaction vessel was charged with para-butylphenol and para-nonylphenol, Solvesso™ 150 solvent (an aromatic solvent), and sodium hydroxide. Formalin was added to the reaction mixture over a period of 0.5 to 1.5 hours. The reaction mixture was then heated to reflux and the reaction was completed within 3-4 hours, Solvesso™ 150 solvent was added to the reaction mixture to adjust the percentage of the resulting resins to 53-55 wt %. During the reaction, the product started to precipitate out of the resin solution. The final yield was 97%, and the appearance of the product was a suspension of partially insoluble material.

Samples of the final product were left under room temperature, and placed in the freezer at −25° C. for 24 hours. The insoluble solid precipitate was isolated and weighted.

Example 2

Synthesis of a Mixture of Calixarene/Linear Alkylphenolic Resins (Resin B)

A reaction vessel was charged with para-tert-butylphenol, Solvesso™ 150 solvent, and sodium hydroxide. Formalin was added to the reaction mixture over 0.5-1.5 hours. The reaction mixture was then heated to reflux. Once the reaction was complete, and the reaction was completed within 3-4 hours, Solvesso™ 150 solvent was added to the reaction mixture to adjust the percentage of the resulting resins to 53-55%. During the reaction, the product started to precipitate out of the resin solution. The final yield was 97%, and the appearance of the product was a suspension of partially insoluble material.

Samples of the final product were left under room temperature, and placed in the freezer at −25° C. for 24 hours. The insoluble solid precipitate was isolated and weighted.

Example 3

Reaction of Calixarene/Linear Alkylphenolic Resins with Propylene Carbonate

A reaction vessel was charged with Resin A of Example 1, which is a mixture of calixarene/linear resin of para-nonylphenol and para-butylphenol in Solvesso™ 150 solvent (containing 53-55% resulting resins), as shown in the synthetic procedures in Example 1. Resin A was added to the reaction vessel immediately after the reaction in Example 1 was complete, without storage under room temperature or at −25° C. The reaction vessel was heated to 130-140° C. Potassium carbonate was then added. The reaction mixture was stirred and the reaction temperature of the mixture was increased to 170-180° C. Once the reaction temperature reached 170-180° C., propylene carbonate was added slowly. After 3 hours, the reaction was complete.

Samples of the final product from each reaction were left under room temperature, and placed in the freezer at −25° C. for 24 hours. The insoluble solid precipitate was isolated and weighted.

Table 1 below shows the amounts of various reactants used in Reactions A-E (with a varying amount of propylene carbonate) and the appearance of the resulting resins after each reaction.

TABLE 1

The amounts of various reactants and the appearance of the resulting resins after the reaction for Sample Nos. A-E.

| | Weight (g) Sample No. | | | | |
|---|---|---|---|---|---|
| | A | B | C | D | E |
| Resin A | 500 | 500 | 500 | 500 | 500 |
| Potassium Carbonate | 6.7 | 6.7 | 6.7 | 6.7 | 6.7 |
| Propylene Carbonate | 0 | 38 | 76 | 113 | 151 |
| Appearance | Cloudy with precipitates | Slightly hazy with small amounts of precipitates | Clear solution | Clear solution | Clear solution |

Table 2 lists the $T_g$ and the percentage insoluble for the sample of the final product from each reaction. Table 3 shows the appearance and percentage insoluble for the sample of the final product from each reaction after storage under room temperature and cold temperature (−25° C.), respectively.

TABLE 2

The amount of propylene carbonate added to Resin A, and the $T_g$, the percentage insoluble, and the percentage Resin A in the resulting resin system for Sample Nos A-E.

| Sample No. | % Propylene Carbonate Out of Total Amount of Propylene Carbonate (151 g) Added | % Resulting Resin A in the system | $T_g$ (° C.) | % Insoluble |
|---|---|---|---|---|
| A | 0 | 57 | 126.3 | 20.8 |
| B | 25 | 56 | | 5 |
| C | 50 | 60 | 102.6 | 0 |
| D | 75 | 61 | | 0 |
| E | 100 | 59 | 94.8 | 0 |

TABLE 3

The percentage insoluble and the appearance of the resulting resins after the reaction for Sample Nos. A-E, under room temperature and cold temperature.

| | Room Temperature | | | Cold Temperature (−25° C.) | | |
|---|---|---|---|---|---|---|
| Sample No. | Time (hours) | Appearance | % Insoluble | Time (hours) | Appearance | % Insoluble |
| A | 24 | Cloudy with precipitates | 20.8 | 24 | Cloudy with precipitates | 20.8 |
| B | 24 | Slightly hazy with small amounts of precipitates | 5 | 24 | Slightly hazy with small amounts of precipitates | 5 |
| C | 24 | Clear solution | 0 | 24 | Clear solution | 0 |
| D | 24 | Clear solution | 0 | 24 | Clear solution | 0 |
| E | 24 | Clear solution | 0 | 24 | Clear solution | 0 |

Example 4

Reaction of Calixarene/Linear Alkylphenolic Resins with Propylene Carbonate

A reaction vessel was charged with Resin B of Example 2, which is a mixture of calixarene/linear novolac resin of para-tert-butylphenol in Solvesso™ 150 solvent (containing 53-55% resulting resins), as shown in the synthetic procedures in Example 2. Resin B was added to the reaction vessel immediately after the reaction in Example 2 was complete, without storage under room temperature or at −25° C. The reaction vessel was heated to 130-140° C. Potassium carbonate was then added. The reaction mixture was stirred and the reaction temperature of the mixture was increased to 170-180° C. Once the reaction temperature reached 170-180° C., propylene carbonate was added slowly. After 3 hours, the reaction was complete.

Samples of the final product from each reaction were left under room temperature, and placed in the freezer at −25° C. for 24 hours. The insoluble solid precipitate was isolated and weighted.

Table 4 below shows the amounts of various reactants used in Reactions F-J (with a varying amount of propylene carbonate) and the appearance of the resulting resins after each reaction.

TABLE 4

The amounts of various reactants and the appearance of the resulting resins after the reaction for Sample Nos. F-J

| | Weights (g) | | | | |
|---|---|---|---|---|---|
| | F | G | H | I | J |
| Resin B | 500 | 500 | 500 | 500 | 500 |
| Potassium Carbonate | 6.7 | 6.7 | 6.7 | 6.7 | 6.7 |
| Propylene Carbonate | 0 | 38 | 76 | 113 | 151 |
| Appearance | Cloudy with precipitates | Slightly hazy with small amounts of precipitates | Slightly hazy with small amounts of precipitates | Clear solution | Clear solution |

Table 5 lists the $T_g$ and the percentage insoluble for the sample of the final product from each reaction. Table 6 shows the appearance and percentage insoluble for the sample of the final product from each reaction after storage under room temperature and cold temperature (−25° C.), respectively.

TABLE 5

The amount of propylene carbonate added to Resin B, and the $T_g$, the percentage insoluble, and the percentage Resin B in the resulting resin system for Sample Nos. F-J.

| Sample No. | % Propylene Carbonate Out of Total Amount of Propylene Carbonate (151 g) Added | % Resulting Resin B in the system | $T_g$ (° C.) | % Insoluble |
|---|---|---|---|---|
| F | 0 | 55 | 158.9 | 29.6 |
| G | 25 | 51 | 140.9 | 10.2 |
| H | 50 | 53 | 120.6 | 7.4 |
| I | 75 | 58 | 103.4 | 0 |
| J | 100 | 56 | 102.5 | 0 |

TABLE 6

The percentage insoluble and the appearance of the resulting resins after the reaction for Sample Nos. F-J, under room temperature and cold temperature.

| Sample No. | Room Temperature | | | Cold Temperature (−25° C.) | | |
|---|---|---|---|---|---|---|
| | Time (hours) | Appearance | % Insoluble | Time (hours) | Appearance | % Insoluble |
| F | 24 | Cloudy with precipitates | 29.6 | 24 | Cloudy with precipitates | 29.6 |
| G | 24 | Slightly hazy with small amounts of precipitates | 10.2 | 24 | Slightly hazy with small amounts of precipitates | 10.2 |
| H | 24 | Slightly hazy with small amounts of precipitates | 7.4 | 24 | Slightly hazy with small amounts of precipitates | 7.4 |
| I | 24 | Clear solution | 0 | 24 | Clear solution | 0 |
| J | 24 | Clear solution | 0 | 24 | Clear solution | 0 |

Although preferred embodiments have been depicted and described in detail herein, it will be apparent to those skilled in the art that various modifications, additions, substitutions, and the like can be made without departing from the spirit of the invention and these are therefore considered to be within the scope of the invention as defined in the claims which follow.

We claim:

1. A process for stabilizing a phenolic resin containing a mixture of linear phenolic resins and calixarenes, comprising:
    contacting, in a one-step process, the phenolic resin with an alkylene carbonate, in the presence of a base catalyst, to at least partially alkoxylate the phenolic hydroxyl groups of the calixarenes, thereby forming a stabilized phenolic resin mixture,
    wherein about 0.2 to 1 mole of alkylene carbonate reacts with the phenolic hydroxyl groups for each mole of the phenolic resin.

2. The process of claim 1, wherein the phenolic hydroxyl groups of the linear phenolic resins are also at least partially alkoxylated.

3. The process of claim 1, wherein the base catalyst is potassium carbonate.

4. The process of claim 1, wherein the alkylene carbonate is propylene carbonate, ethylene carbonate, or butylene carbonate.

5. The process of claim 4, wherein the alkylene carbonate is propylene carbonate.

6. The process of claim 1, wherein the benzene ring of the linear phenolic resins and calixarenes is independently substituted by H, $C_1$ to $C_{30}$ alkyl, phenyl, or arylalkyl.

7. The process of claim 1, wherein the linear phenolic resins and calixarenes independently contain a $C_1$ to $C_7$ alkyl substituent on the benzene ring.

8. The process of claim 1, further comprising:
    reacting one or more phenolic compound with an aldehyde, in the presence of a base catalyst, to form the phenolic resin containing a mixture of linear phenolic resins and calixarenes.

9. The process of claim 8, wherein the benzene ring of the phenolic compound is substituted by H, $C_1$ to $C_{30}$ alkyl, phenyl, or arylalkyl.

10. The process of claim 8, wherein at least one phenolic compound has a $C_1$ to $C_7$ alkyl substituent on the benzene ring.

11. The process of claim 1, wherein the phenolic resin contains about 20% to about 75% calixarenes.

12. A process for stabilizing a phenolic resin containing a mixture of linear phenolic resins and calixarenes, comprising:
    contacting, in a one-step process, the phenolic resin with an alkylene carbonate, in the presence of a base catalyst and a hydrocarbon solvent, to at least partially alkoxylate the phenolic hydroxyl groups of the calixarenes, thereby forming a stabilized phenolic resin mixture,
    wherein less than 10% of the calixarenes precipitate out of the solvent after 24 hours.

13. The process of claim 12, wherein less than 5% of the calixarenes precipitate out of the solvent after 24 hours.

14. The process of claim 12, wherein the formed stabilized phenolic resin mixture is substantially free of undissolved solid components, without adding additional solvents.

15. The process of claim 12, wherein the hydrocarbon solvent is an aromatic hydrocarbon.

16. A process for increasing the solubility of a linear phenolic resin/calixarene mixture, comprising:
    contacting, in a one-step process, a phenolic resin containing a mixture of linear phenolic resins and calixarenes with an alkylene carbonate, in the presence of a base catalyst, to at least partially alkoxylate the phenolic hydroxyl groups of the calixarenes,
    wherein the solubility of the linear phenolic resin/calixarene mixture in a hydrocarbon solvent is increased by at least 50%.

17. The process of claim 16, wherein the solubility of the linear phenolic resin/calixarene in a hydrocarbon solvent is increased by at least 60%.

18. The process of claim 16, wherein the hydrocarbon solvent is an aromatic hydrocarbon.

19. A demulsifier composition comprising the stabilized phenolic resin mixture prepared by the process of claim 1.

20. The demulsifier composition of claim 19, wherein the stabilized phenolic resin mixture is a resin solution having a concentration of 50% to 75% resin by weight.

* * * * *